Patented Dec. 5, 1939

2,182,754

UNITED STATES PATENT OFFICE 2,182,754

PROCESS OF PREPARING CYCLIC ACETALS OF FORMALDEHYDE

Kurt Billig, Frankfort-on-the-Main-Hochst, Germany, assignor to I. G. Farbenindustrie Aktiengesellschaft, Frankfort-on-the-Main, Germany No Drawing. Application November 4, 1937, Serial No. 172,765. In Germany November 19, 1936

5 Claims. (Cl. 260—338)

The present invention relates to a process of preparing cyclic acetals of formaldehyde.

I have found that aqueous formaldehyde solutions react very readily with organic oxides in the presence of acid catalysts with formation of the corresponding cyclic acetals of formaldehyde. It is possible that this reaction occurs in two phases: the oxide is first added to the hydrate form of formaldehyde and this intermediate product suffers ring-closure with separation of water.

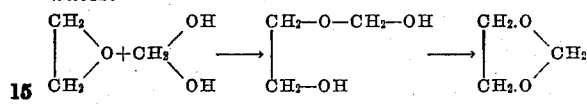

As organic oxides there may be used ethylene oxide, propylene oxide, epichlorhydrin, benzylethylene oxide and similar substances. Instead of, or in addition to the free acid, which may be sulfuric acid, an organic sulfonic acid such as toluene sulfonic acid, cresol sulfonic acid, benzene sulfonic acid or beta-naphthol sulfonic acid, or oxalic acid, or a hydrohalogen acid there may be added an acid salt such as acid potassium sulfate or acid sodium sulfate, or a normal salt which under the conditions of reaction has an acid action, such as calcium chloride, aluminium chloride or zinc chloride. According to the conditions applied, the reaction may be continuous or discontinuous. The components are applied in about equivalent quantities.

Particularly good yields may be obtained by carrying out the reaction in two phases with different catalysts. In the first phase the aqueous solution of formaldehyde is caused to react with the oxide at temperatures between about 50° C. and about 100° C. in the presence of catalysts incapable of forming stable addition products with the alkylene oxide. Such catalysts are, for instance, the above named substances except those containing halogen. In the second phase the intermediate condensation product of formaldehyde and the oxide thus obtained is heated to temperatures between about 100° C. and about 150° C. in the presence of a catalyst of the group consisting of hydrogen chloride, hydrogen bromide and their acid reacting metal salts. Preferably the catalyst added in the first phase is first neutralized by the addition of compounds which react with the said catalyst while forming sparingly soluble or sparingly dissociating salts. In the case of a catalyst consisting of sulfuric acid, an acid sulfate or a sulfonic acid there may be used an addition of for instance calcium chloride or barium chloride. Furthermore there may be worked in the second phase in the presence of the glycol which corresponds to the oxide used.

By the new process the cyclic acetals of formaldehyde which are extremely important, particularly as solvents, have been made very readily accessible for industrial purposes.

The following examples serve to illustrate the invention, but they are not intended to limit it thereto; the parts are by weight:

1. 440 parts of ethylene oxide are caused to flow into 1000 parts of aqueous formaldehyde of 30 per cent. strength acidified with 2 parts of concentrated sulfuric acid. By first cooling and then heating the temperature is kept between 50° C. and 100° C. When ethylene oxide is no longer present, the sulfuric acid is converted into calcium or barium sulfate by addition of an equivalent quantity or an excess of calcium chloride or barium chloride, whereby the acidity of the mixture becomes due to hydrochloric acid. The mixture is then caused to flow into a vessel provided with a stirring device and a distilling apparatus, one third or one half of which is filled with glycol or with a mixture of glycol and polyglycols obtainable by addition of water to ethylene oxide. The glycol first introduced is rendered acid with 1 part per thousand of fuming hydrochloric acid. At the same time the temperature is maintained at 100° C. to 130° C. and the speed of flow is regulated so that the reaction product distils pari passu with the introduction of the reaction mixture.

The glycol contained in the vessel changes only slightly so that many hundred times its volume of the reaction mixture may be passed through the vessel. From the reaction product which has been distilled the glycol-formaldehyde-acetal is separated by a known method, for instance by distillation in a high column, still drying and fractionating to obtain the product in a pure condition. The yields amount to about 80 per cent. and more of the theoretical.

Instead of the pure liquefied ethylene oxide there may be used with a similarly good result the crude product obtained during the preparation of glycol chlorhydrin. It is not necessary to liquefy the oxide, since the gaseous ethylene oxide leaving the reaction vessel may at once be dissolved in aqueous formaldehyde and then caused to react.

2. 1.2-propylene oxide is caused to react with aqueous formaldehyde of 30 per cent. strength in a manner quite analogous to that described in Example 1. 580 parts of propylene oxide are caused to react with 1000 parts of aqueous formaldehyde of 30 per cent. strength which is acidified with 1 to 2 parts per thousand of sulfuric acid. As soon as propylene oxide is no longer present, 3 parts of anhydrous calcium chloride are added, the whole is allowed to flow into a vessel about half full of methyl glycol acidified with hydrochloric acid and heated to 100° C. to 130° C. as described in Example 1. The methyl glycol formaldehyde acetal is separated in known manner from the reaction product which has been distilled. The yields are the same as those of Example 1.

3. 600 parts of 1.2-propylene oxide are caused to flow into a vessel provided with a stirring device and a reflux condenser and containing 1000 parts of aqueous formaldehyde to which 2 parts of concentrated sulfuric acid have been added. As soon as the evolution of heat ceases, the whole is boiled under reflux for some time and the reaction product is then distilled, methyl glycol formaldehyde acetal being obtained from the distillate in the usual manner.

4. 110 parts of ethylene oxide are caused to flow into 250 parts of aqueous formaldehyde of 30 per cent. strength containing as catalyst 1 part of crystallized oxalic acid, while keeping the temperature between 50° C. and 100° C. As soon as ethylene oxide is no longer present, that is to say when the first phase is finished, the second reaction phase is carried out in the presence of another catalyst having an acid reaction, namely in the presence of hydrochloric acid, in a manner similar to that described in Examples 1 and 2. This is attained by the addition of calcium chloride or barium chloride whereby the oxalic acid is converted into the corresponding calcium salt or barium salt and simultaneously the reaction liquid is combined with hydrochloric acid. The further treatment is the same as that of Example 1.

I claim:

1. The process which comprises causing an aqueous solution of formaldehyde to act upon an alpha alkylene oxide at temperatures between about 50° C. and about 100° C. in the presence of a strongly acid condensation catalyst and then heating the intermediate condensation product of formaldehyde and alkylene oxide thus formed at temperatures between about 100° C. and about 150° C. in the presence of a catalyst of the group consisting of hydrogen chloride, hydrogen bromide and their acid reacting metal salts.

2. The process which comprises causing an aqueous solution of formaldehyde to act upon an alpha alkylene oxide at temperatures between about 50° C. and about 100° C. in the presence of a strongly acid condensation catalyst, then heating the intermediate condensation product of formaldehyde and alkylene oxide thus formed at temperatures between about 100° C. and about 150° C. in the presence of a catalyst of the group consisting of hydrogen chloride, hydrogen bromide and their acid reacting metal salts and continuously removing by means of an azeotropic distillation the water and the cyclic acetal formed during the reaction.

3. The process which comprises causing an aqueous formaldehyde of 30 per cent. strength to act upon ethylene oxide in the presence of sulfuric acid at a temperature between 50° C. and 100° C., heating the intermediate condensation product of formaldehyde and ethylene oxide thus formed at a temperature between 100° C. and 130° C. in the presence of hydrogen chloride and continuously removing by means of an azeotropic distillation the water and the cyclic acetal thus formed.

4. The process which comprises causing an aqueous formaldehyde of 30 per cent. strength to act upon 1.2-propylene oxide in the presence of sulfuric acid at a temperature between 50° C. and 100° C., heating the intermediate condensation product of formaldehyde and propylene oxide thus formed at a temperature between 100° C. and 130° C. in the presence of hydrogen chloride and continuously removing by means of an azeotropic distillation the water and the cyclic acetal thus formed.

5. The process which comprises causing an aqueous solution of formaldehyde to act upon 1.2-propylene oxide in the presence of sulfuric acid at the boiling point of the reaction mixture.

KURT BILLIG.